United States Patent
Elliot et al.

(10) Patent No.: US 7,774,399 B2
(45) Date of Patent: Aug. 10, 2010

(54) SHIFT-ADD BASED PARALLEL MULTIPLICATION

(75) Inventors: Gibson Dana Elliot, Oak Run, CA (US); Charles H. Moore, Sierra City, CA (US)

(73) Assignee: VNS Portfolio LLC, Cupertino, CA (US)

( * ) Notice: Subject to any disclaimer, the term of this patent is extended or adjusted under 35 U.S.C. 154(b) by 187 days.

(21) Appl. No.: 12/148,515

(22) Filed: Apr. 18, 2008

(65) Prior Publication Data

US 2009/0083360 A1     Mar. 26, 2009

Related U.S. Application Data

(60) Provisional application No. 60/974,820, filed on Sep. 24, 2007.

(51) Int. Cl.
*G06F 7/52* (2006.01)
(52) U.S. Cl. ....................................... 708/627
(58) Field of Classification Search ............... 708/625, 708/627, 632
See application file for complete search history.

(56) References Cited

U.S. PATENT DOCUMENTS

| | | | |
|---|---|---|---|
| 4,086,474 A * | 4/1978 | Negi et al. ............ | 708/625 |
| 4,901,264 A | 2/1990 | Hayashi | |
| 4,947,364 A | 8/1990 | Mahon et al. | |
| 5,117,385 A | 5/1992 | Gee | |
| 5,187,676 A | 2/1993 | DeVane | |
| 5,287,299 A * | 2/1994 | Lin ........................ | 708/627 |
| 5,535,151 A | 7/1996 | Kurokawa | |
| 5,539,685 A * | 7/1996 | Otaguro ................. | 708/625 |
| 6,760,742 B1 | 7/2004 | Hoyle | |
| 2009/0083361 A1 | 3/2009 | Moore | |

FOREIGN PATENT DOCUMENTS

| | | |
|---|---|---|
| WO | WO2006/015624 | 2/2006 |
| WO | WO2009/042107 | 4/2009 |
| WO | WO2009/042111 | 4/2009 |

OTHER PUBLICATIONS

PCT Application No. PCT/US2008/011000, International Search Report and Written Opinion dated Apr. 27, 2009.
U.S. Appl. No. 12/148,509, Office Action dated Jan. 5, 2010.
PCT Application no. PCT/US2008/011004, International Search Report and Written Opinion dated Apr. 29, 2009.

* cited by examiner

*Primary Examiner*—Chuong D Ngo
(74) *Attorney, Agent, or Firm*—Henneman & Associates, PLC; Larry E. Henneman, Jr.

(57) ABSTRACT

A system for performing parallel multiplication on a plurality of factors. In a binary processor, a first and a second memory have pluralities of bit-positions. The first memory holds a first value as a multiplier that will commonly serve as multiple of the factors, and the second memory holds a second value that is representative of multiple multiplicands that are other of the factors. A multiplier bit-count is determined of the significant bits in the multiplier. And a +* operation is performed with the first value and said second value a quantity of times equaling the multiplier bit-count.

14 Claims, 15 Drawing Sheets

FIG.5a (background art)

T 500: [0, 0, 0, 0, 0, 0, 0, 0, 0, 0, 0, 0, 0, 0, 0, A, B, C]
labels: 502, 504, 506, 508, 510, 512

S 520: [0, 0, 0, 0, 0, 0, 0, 0, 0, 0, 0, X, Y, Z, 0, 0, 0, 0]
labels: 522, 524, 526, 528, 530, 532

FIG.5b (background art)

| 502 | 504 | 506 | 508 | 510 | 512 |
|---|---|---|---|---|---|
| Q | R | S | T | U | V |

T 500: 0,0,0,0,0,0,0,0,0,0,Q,R,S,T,U,V

| 522 | 524 | 526 | 528 | 530 | 532 |
|---|---|---|---|---|---|
| X | Y | Z | 0 | 0 | 0 |

| 602 | 604 | 606 | 608 | 610 | 612 | 614 | 616 | 618 | 620 | 622 | 624 |
|---|---|---|---|---|---|---|---|---|---|---|---|
| 0 | 0 | 0 | 0 | 0 | 0 | 0 | 0 | 0 | 0 | 0 | 0 | 0 | 0 | 0 | A | B | C |

S 630:

| 632 | 634 | 636 | 638 | 640 | 642 | 644 | 646 | 648 | 650 | 652 | 654 |
|---|---|---|---|---|---|---|---|---|---|---|---|
| 0 | 0 | 0 | 0 | 0 | 0 | 0 | 0 | 0 | 0 | 0 | 0 | 0 | 0 | 0 | X | Y | Z |

D1 660:

| 662 | 664 | 666 | 668 | 670 | 672 | 674 | 676 | 678 | 680 | 682 | 684 |
|---|---|---|---|---|---|---|---|---|---|---|---|
| 0 | 0 | 0 | 0 | 0 | 0 | 0 | 0 | 0 | 0 | 0 | 0 | 0 | 0 | 0 | L | M | N |

| T 600 | 0 | 0 | 0 | 0 | 0 | E | F | G | H | I | J | Q | R | S | T | U | V |
|---|---|---|---|---|---|---|---|---|---|---|---|---|---|---|---|---|---|
| | | | | | 602 | 604 | 606 | 608 | 610 | 612 | 614 | 616 | 618 | 620 | 622 | 624 |

| S 630 | 0 | 0 | 0 | 0 | 0 | L | M | N | O | O | X | Y | Z | O | O | O |
|---|---|---|---|---|---|---|---|---|---|---|---|---|---|---|---|---|
| | | | | | 632 | 634 | 636 | 638 | 640 | 642 | 644 | 646 | 648 | 650 | 652 | 654 |

| D1 660 | 0 | 0 | 0 | 0 | 0 | L | M | N | O | O | O | O | O | O | O | O |
|---|---|---|---|---|---|---|---|---|---|---|---|---|---|---|---|---|
| | | | | | 662 | 664 | 666 | 668 | 670 | 672 | 674 | 676 | 678 | 680 | 682 | 684 |

FIG.6d

702 ->  3 {node
704 ->  0 org

706 ->  : 6>> ( n1 - n2)   2/ 2/ 2/   2/ 2/ 2/ ;

708 ->  here =pc
710 ->  : mult1
712 ->     $3f # $10a20 # $7 #
714 ->     +* +* +*            \ perform the multiplication
716 ->     push drop pop       \ discard the left over factor
718 ->     over over and       \ mask off other numbers
720 ->     push 6>>            \ push first extracted result
722 ->     over over and       \ mask again
724 ->     push 6>>            \ push second extracted result
726 ->     push drop           \ push final result, drop mask
728 ->     begin again         \ stop here 730 ->  node}

| 802 | 804 | 806 | 808 | 810 | 812 | 814 | 816 | 818 | 820 | 822 | 824 | 826 | 828 | 830 | 832 | 834 | 836 |
|---|---|---|---|---|---|---|---|---|---|---|---|---|---|---|---|---|---|
| 0 | 0 | 1 | 1 | 1 | 0 | 1 | 0 | 0 | 0 | 1 | 1 | 0 | 1 | 1 | 1 | 0 | 0 |

800 ⤳ T

| 842 | 844 | 846 | 848 | 850 | 852 | 854 | 856 | 858 | 860 | 862 | 864 | 866 | 868 | 870 | 872 | 874 | 876 |
|---|---|---|---|---|---|---|---|---|---|---|---|---|---|---|---|---|---|
| 0 | 1 | 0 | 0 | 0 | 0 | 1 | 0 | 1 | 0 | 0 | 0 | 1 | 0 | 0 | 0 | 0 | 0 |

SHIFT-ADD BASED PARALLEL MULTIPLICATION

CROSS-REFERENCE TO RELATED APPLICATIONS

This application claims the benefit of U.S. Provisional Application No. 60/974,820 entitled "Shift-Add Mechanism," filed Sep. 24, 2007 by at least one common inventor, which is incorporated herein by reference in its entirety.

BACKGROUND OF THE INVENTION

1. Technical Field

The present invention relates generally to electrical computers and digital processing systems having processing architectures and performing instruction processing, and more particularly to processes for multiplication that can be implemented in such.

2. Background Art

Many modern computerized processes employ complex mathematics, wherein the calculations are actually performed mostly with just a few fundamental operations. Two particular such fundamental operations are of present interest, adding and multiplying values. Multiplication can be performed as a series of additions, but it usually is more efficient to use just a few addition operations combined with other fundamental operations like bit-wise shifts. For this reason, it is therefore often best to regard addition and multiplication separately when used in computerized processes.

Optimizing computerized processes is important to improve applications in which the processes are already used, as well as to permitting new applications to emerge. Optimizing computerized processes is an ongoing quest that can be accomplished by optimizing the hardware or the algorithms performing the processes, or both.

Digital signal processing (DSP) is a computerized process that is widely used in modern electronic communications, and that serves very well as an example here. When performing DSP, it is desirable that overall speed and efficiency be optimized. An appreciation of the underlying mathematics used in the DSP is important for accomplishing this.

The mathematical term "transform" refers to a very powerful technique used for analyzing certain types of integral or differential equations, in particular including those describing linear time invariant systems. The concept to the transform traces its roots to the functional analysis branch of mathematics, which primarily deals with the study of spaces of functions in which a particular function has another function as its argument. The transform of one or more integral or differential equations can employ a mapping technique where an original equation or equations that are represented in a time dependent domain are transformed into a complex domain. The result of this often leads to a more solvable set of equations than the original equations and, upon finding the solution in the complex domain, an inverse transform can be performed to map the solution back to the time dependent domain. A general form of an integral transform can be defined as:

$$g(\alpha) = \int_a^b f(t)K(\alpha, t)dt \tag{1}$$

where $K(\alpha,t)$ is often referred to as the Integral Kernel of the transform. The class of integral equations described by equation (1) has a broad practical application into areas such as electrical circuits, harmonic oscillators, optical devices, mechanical systems, signal processing, and many others.

The Laplace Transform $L\{f(t)\}$ is a subset of the class of transforms defined by equation (1) and is defined as a function of the variable s where the limits of integration and the integral kernel are redefined from equation (1) as $a=0$, $b=\infty$, and $K(\alpha,t)=e^{-st}$:

$$L\{f(t)\} = \int_0^\infty f(t)e^{-st}dt. \tag{2}$$

The use of a laplace transform on $f(t)$ is only valid when s is sufficiently large and certain conditions are met. These conditions are flexible enough, however, to allow $f(t)$ to take on the functional form of nearly any useful function found in practice.

It is an all too common occurrence, unfortunately, that a certain function F(s) is not the transform of a single known function. On the other hand, F(s) can be represented as the product of two functions $\hat{f}(s)$ and $\hat{g}(s)$, each of which is the result of the transform of a known function $f(t)$ and $g(t)$, respectively:

$$F(s) = \hat{f}(s)\hat{g}(s), \tag{3}$$

wherein g(t) must satisfy the same conditions as $f(t)$. By understanding this link between F(s), $f(t)$, and g(t) the following holds:

$$F(s) = L\left\{\int_0^t f(t-\tau)g(\tau)d\tau\right\}, \tag{4}$$

which is referred to as the Convolution Theorem.

At this point it should be noted that the convolution theorem results in a transformation of an integral of just one variable. The techniques for approximating an integral of just one variable therefore apply. Between the integral representation and a Riemann Sum representation for the convolution integral defined in equation (4), the following holds:

$$\int_0^t f(t-\tau)g(\tau)d\tau = \lim_{\Delta\tau \to 0} \sum_{k=0}^t f(c_{t-k})g(c_k)\Delta\tau, \tag{5}$$

where each $c_{t-k}$ and $c_k$ are chosen arbitrarily in the $k^{th}$ subinterval. In practice the right hand side of the equality in equation (5) is approximated by utilizing a very small $\Delta t$ and realizing there exists an error term of some order dependent on the numerical technique chosen and the value of $\Delta t$, this can be expressed as:

$$\lim_{\Delta\tau \to 0} \sum_{k=0}^t f(c_{t-k})g(c_k)\Delta\tau = \sum_{k=0}^t f(c_{t-k})g(c_k)\Delta\tau + O(\Delta\tau^m), \tag{7}$$

where m is the order of accuracy that can be represented by the resultant sum. (The value of m also represents the number of digits of precision that can be expected.) Any numerical technique used to approximate the convolution integral will result in a large number of multiplications and additions, and it follows that speeding up the processes of multiplication and/or addition will result in a greater overall speed when performing the convolution method.

The use of convolution is a preferred method in the course of performing DSP, particularly where a digital filter is used to remove unwanted parts or to extract useful parts of a signal. Any desired filtering that can be expressed as a mathematical function can be achieved through the use of a digital filter to perform numerical calculations on sampled data values of a signal. The integral kernel previously described is essentially another name for the digital filter.

Finite impulse response (FIR) and infinite impulse response (IIR) are the two main types of digital filters that are used in DSP applications. The difference between an IIR and FIR filter is in the impulse response function that describes the filtering function. An IIR filter utilizes an impulse function which is non-zero over an infinite length of time, whereas an FIR filter utilizes an impulse function which will ultimately settle to zero over a finite time interval.

The more common of the two filter types is the FIR. This is mainly due to the fact that a FIR filter does not have internal feedback to the filter, like an IIR filter does. Such internal feedback can cause an IIR filter to respond indefinitely to an impulse. The advantage of a FIR filter is thus apparent by the word finite in the filter's name. The use of this word indicates that the impulse from the filter will ultimately settle to zero. This advantage of the FIR filter is apparent in another way; error does not propagate during an iterative summing process, meaning the error term will stay constant throughout the entire process. This is a distinct advantage over an IIR filter, where the error could potentially propagate for each additional iterative output sum.

A major drawback of digital filters today is that their speed is restricted by the speed of the processor hardware used, and if high filtering speeds are required the processor hardware can be very expensive. Digital filters have nonetheless become commonplace in almost every electronic communication device, as the cost of processing power has decreased immensely over the last few years. This has resulted in an industry wide unresponsiveness to reducing the computational costs associated with a DSP. This unresponsiveness cannot continue, however, as further increases in computational power are becoming increasingly difficult to achieve in conventional processor hardware.

Summarizing, first by reiterating: optimizing computerized processes is an ongoing quest that can be accomplished by optimizing the hardware or the algorithms performing the processes (or both). In computerized processes, multiplication is important and there will be welcome benefit if how multiplication is accomplished in such processes can be improved.

BRIEF SUMMARY OF THE INVENTION

Accordingly, it is an object of the present invention to provide a system for parallel multiplication.

Briefly, one preferred embodiment of the present invention is a mechanism for performing parallel multiplication on a plurality of factors. A binary processor is provided which has a first and second memory having pluralities of bit-positions. The first memory holds a first value as a multiplier that will commonly serve as multiple of the factors, and the second memory holds a second value that is representative of multiple multiplicands that are other of the factors. A multiplier bit-count of the significant bits in the multiplier is determined. And a logic in the processor performs a +* operation with the first and second values a quantity of times equaling the multiplier bit-count.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which.

Figure 5A:
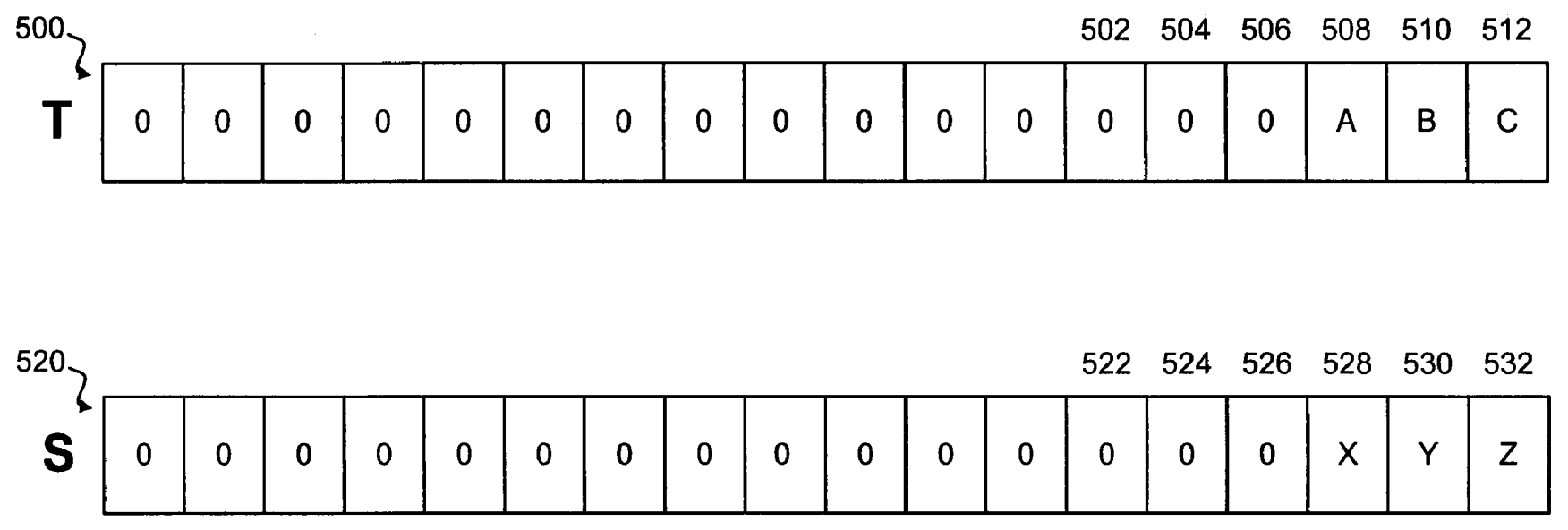
Figure 1:
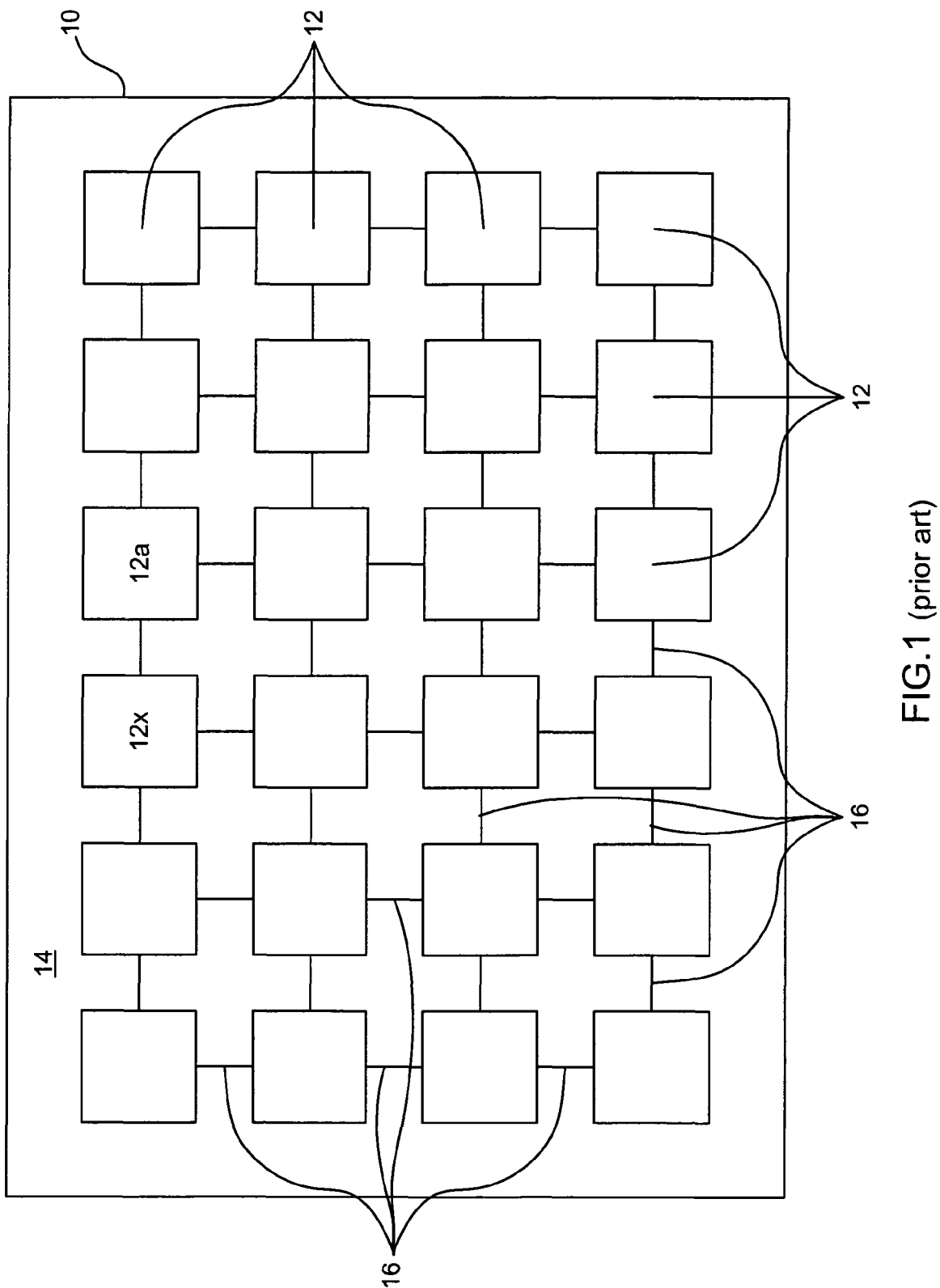
FIG. 1 (prior art) is a diagrammatic view of a computer array having a plurality of computers that each are a hardware environment where both the prior art and the present invention may be employed.

FIGS. 5a-c (background art) are diagrammatic views of the T-register and the S-register of the data stack that demonstrate operation of the +* op-code being used for multiplication on exemplary data.

FIGS. 6a-d are diagrammatic views of the T-register, the S-register, and a D1-register, all being used for multiplication of exemplary data in a manner in accord with the present inventive parallel multiplication mechanism.

FIG. 7 shows Venture Forth™ code to carry out the parallel multiplication in accord with the inventive parallel multiplication mechanism.

FIGS. 8a-c show the contends of the T and S registers during an example calculation using the code in FIG. 7.

In the various figures of the drawings, like references are used to denote like or similar elements or steps.

DETAILED DESCRIPTION OF THE INVENTION

A preferred embodiment of the present invention is an improved system for multiplication. As illustrated in the various drawings herein, and particularly in the view of FIG. 7, preferred embodiments of the invention are depicted by the general reference character 100.

To appreciate the present invention and to contrast it against the prior art, it is useful to consider a hardware environment where both the prior art and the present invention may be employed. FIG. 1 (prior art) is a diagrammatic view of a computer array 10 having a plurality (twenty-four in the example shown) of computers (sometimes also referred to as "cores" or "nodes" when the array is implemented in a single module or on a single semiconductor die). These computers are referred to herein collectively as computers 12 and individually as computers 12a-x. In the exemplary array 10 shown, each of the computers 12a-x is located on a single die 14. Each of the computers 12 is a generally independently functioning digital processor and is interconnected to the others by a plurality of interconnecting data buses 16. The array 10 here may particularly be a SEAforth™ 24a device by IntellaSys™ Corporation of Cupertino, Calif., a member of The TPL Group™ of companies, and for the sake of example the following discussion proceeds on this basis.

Figure 2:
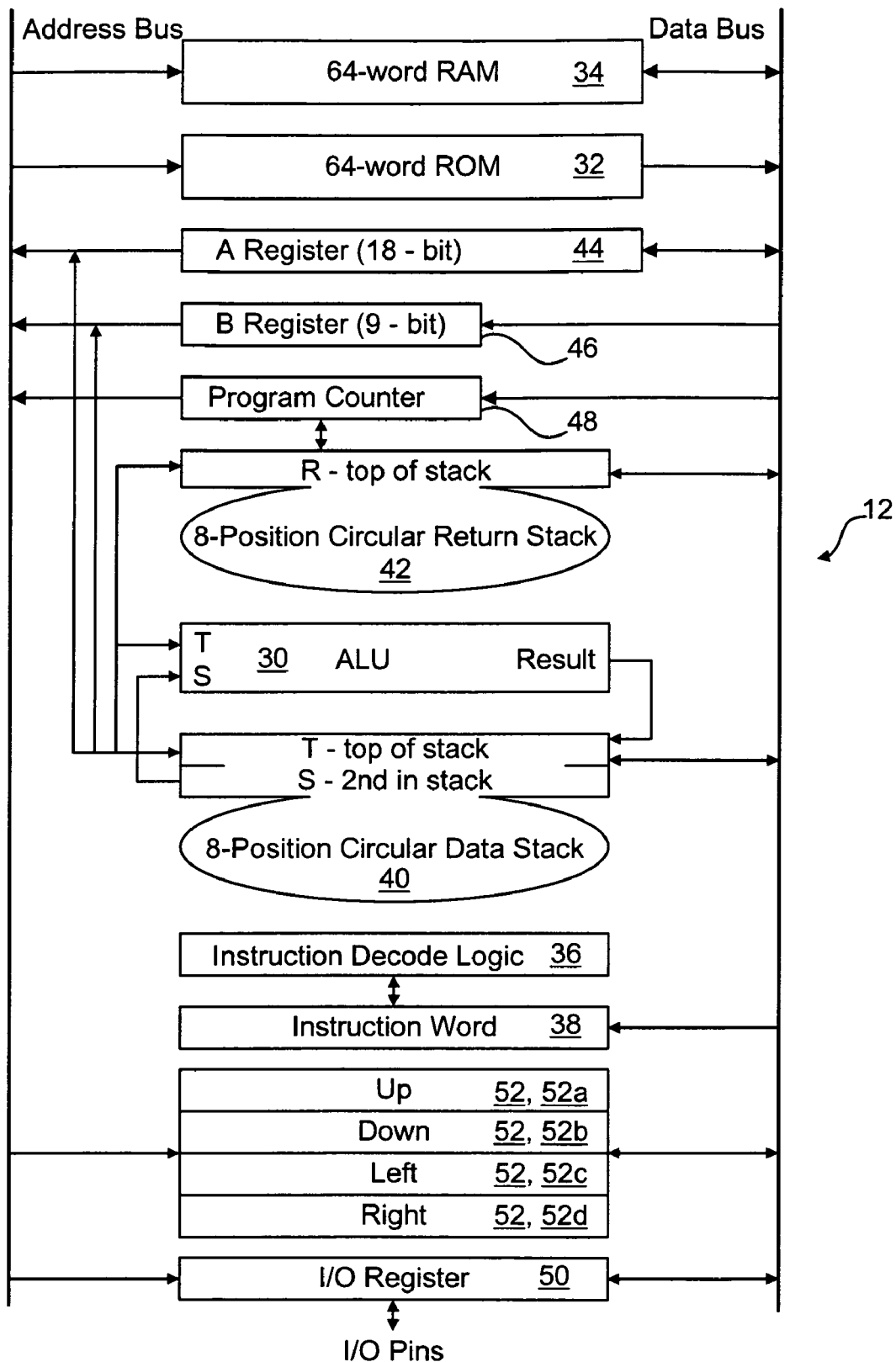
FIG. 2 (prior art) is a diagrammatic view of the major internal features of one of the computers in FIG. 1.

FIG. 2 (prior art) is a diagrammatic view of the major internal features of one of the computers 12 in FIG. 1, i.e., of each of the computers 12a-x. As can be seen, each is generally an independently functioning digital processor, including an arithmetic logic unit (ALU 30), a quantity of read only memory (ROM 32), a quantity of random access memory (RAM 34), an instruction decode logic section 36, an instruction word 38, a data stack 40, and a return stack 42. Also included are an 18-bit "A" register (A-register 44), a 9-bit "B" register (B-register 46), a 9-bit program counter register (P-register 48), and an 18-bit I/O control and status register (IOCS-register 50). Further included are four communications ports (collectively referred to as ports 52 and individually as ports 52a-d). Except for the edge and corner cases, these ports 52 each connect to a respective bus 28 (i.e., the buses 16 of FIG. 1). Each bus 28 has 18 data lines, a read line, and a write line (not shown individually here in FIG. 2).

Figure 3:
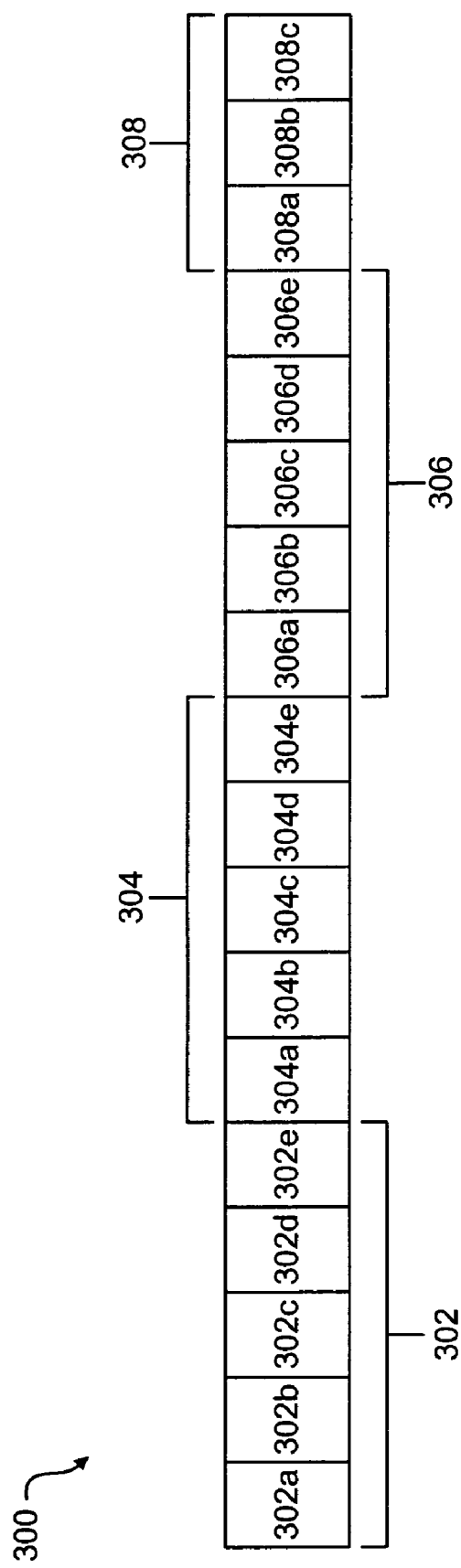
FIG. 3 (prior art) is a diagrammatic view of an individual 18-bit wide register that can be in the ROM, RAM, A-register, return stack, data stack, instruction word, or IOCS-register shown in FIG. 2.

FIG. 3 (prior art) is a diagrammatic view of an individual 18-bit wide register 300 that can be in the ROM 32, RAM 34, A-register 44, return stack 42, data stack 40, instruction word 38, or IOCS-register 50 shown in FIG. 2. This register 300 can contain instructions, data, or some combination thereof. The register 300 here is subdivided into four slots 302-308 with unequal bit lengths. As can be seen, slot 302 has five bits, labeled bits 302a-e; slot 304 has five bits, labeled bits 304a-e; slot 306 has five bits, labeled bits 306a-e; and slot 308 has three bits, labeled bits 308a-c.

When register 300 holds the instruction word 38 of FIG. 2, the designers of the SEAforth™ 24a device often point out that the register 300 actually contains 3 and 3/5 instructions. The significance of a slot like slot 308 that does not contain the same number of bits as the others may appear odd, but slot 308 nonetheless is quite useful with the instruction set utilized in the SEAforth™ 24a. This instruction set has five bit instructions, generally, but also has certain predetermined operational codes (op-codes) that "fit" in three bits and thus fit in slot 308. These predetermined op-codes fit because their two least significant bits are zero. Two bits (not shown) to the right of bit 308c are hard wired to ground, which allows proper execution of the predetermined "short" op-codes.

Multiplication in the SEAforth™ 24a can be accomplished by successive operations of a shift-add ("+*") op-code. The +* op-code does not perform multiplication by itself, however, instead the actions associated with this op-code can result in multiplication. Multiplication requires two factors, oftentimes termed the "multiplier" and the "multiplicand." For multiplication utilizing the +* op-code in the SEAforth™ 24a device, the multiplier is initially placed in the T register of the data stack 40 and the multiplicand is initially placed in the S register of the data stack 40. Then the +* op-code is executed a number of times.

The +* op-code executes a conditional add followed by a non-conditional bit shift that use both the T and S registers of the data stack 40. The +* op-code only modifies the value in the T register, however, and leaves the value in the S register unchanged.

Figure 4:
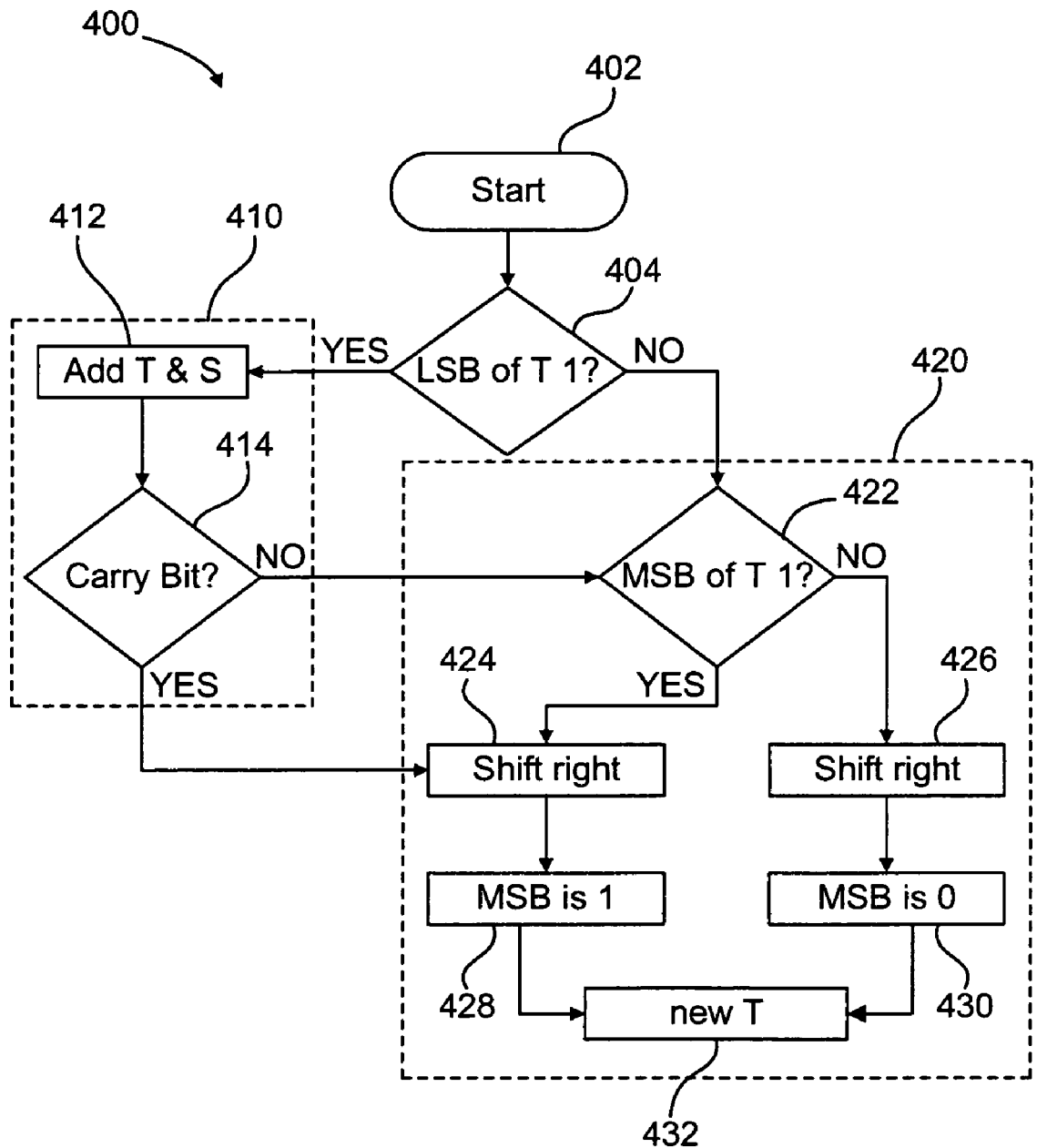
FIG. 4 (background art) is a flow chart of a shift-add process corresponding with operation of the +* op-code.

FIG. 4 (background art) is a flow chart of a shift-add process 400 corresponding with operation of the +* op-code. [FIG. 4 is background art rather than prior art here because operation of the +* op-code was performed differently in earlier embodiments of the SEAforth™ 24a device.]

The shift-add process 400 has two major sub-processes, a conditional add sub-process 410 and a shift sub-process 420. The shift-add process 400 starts in a step 402 and in a step 404 the content of the LSB of T is examined, which determines whether the conditional add sub-process 410 or the shift sub-process 420 follows.

Turning first to the shift sub-process 420, when the LSB of T is 0, in a step 422 the content of the MSB of T is examined. And when the MSB of T is 0, in a step 426 the contents of T are shifted right, in a step 430 the MSB of T is filled with a 0, and in a step 432 T contains its new value. Alternately, when the MSB of T is 1, in a step 424 the contents of the T are shifted right, in a step 428 the MSB of T is filled with a 1, and step 432 now follows where T now contains its new value.

Turning now to the conditional add sub-process 410, when the LSB of T is 1, in a step 412 the contents of T and S are added and in a step 414 whether this produces a carry (i.e., sets a carry bit to 1) is determined. If there was no carry (the carry bit is 0), the shift sub-process 420 is entered at step 422, as shown. Alternately, if there was a carry (the carry bit is 1), the shift sub-process 420 is entered at step 424, as shown. And then the shift-add process 400 continues with the shift sub-process 420 through step 432, where T will now contain a new value.

FIGS. 5a-c (background art) are diagrammatic views of the T-register 500 and the S-register 520 of the data stack 40 that demonstrate operation of the +* op-code being used for multiplication on exemplary data. Starting with FIG. 5a, the low order six bits of the T-register 500 are labeled bits 502-512 and the low order six bits of the S-register 520 are labeled bits 522-532, as shown. The T-register 500 holds the value "ABC" right-justified (a multiplier having three significant bits) and the S-register 520 holds the value "XYZ" right-justified (a multiplicand having three significant bits). The rest of the bits of the T-register 500 and the S-register 520 are zero-filled.

FIG. 5b illustrates that the three bit value ("XYZ") in the S-register 520 has been shifted to the left (in a higher order-ward direction) three bit positions. However, XYZ is still a 3-bit value, even though it is now represented by six bits. Basically, the multiplicand has been shifted so that its least significant bit (LSB) is now one order higher than the most significant bit of the multiplier, and the vacated bits 528-532 have been zero-filled.

FIG. 5c illustrates the effect of utilizing the +* op-code three successive times (once for each significant bit of the multiplicand). The multiplier in the T-register 500 is now replaced with the product of the multiplier ABC with the multiplicand XYZ, shown as "QRSTUV" here. This resultant product QRSTUV can have a minimum of five and at most six significant bits, so it is important to consider the resultant product QRSTUV as occupying the six bits 502-512 in the T-register 500. It is additionally important to note here that multiplication in this manner is non-destructive or only partially destructive, because the S-register 520 still holds multiplicand XYZ.

As an exercise, one can take binary "101" (decimal 5) as ABC and binary "100" (decimal 4) as XYZ, apply the +* op-code for multiplication in the manner just described, and confirm that binary "010100" (decimal 20) is the result arrived at in QRSTUV.

Figure 6C:
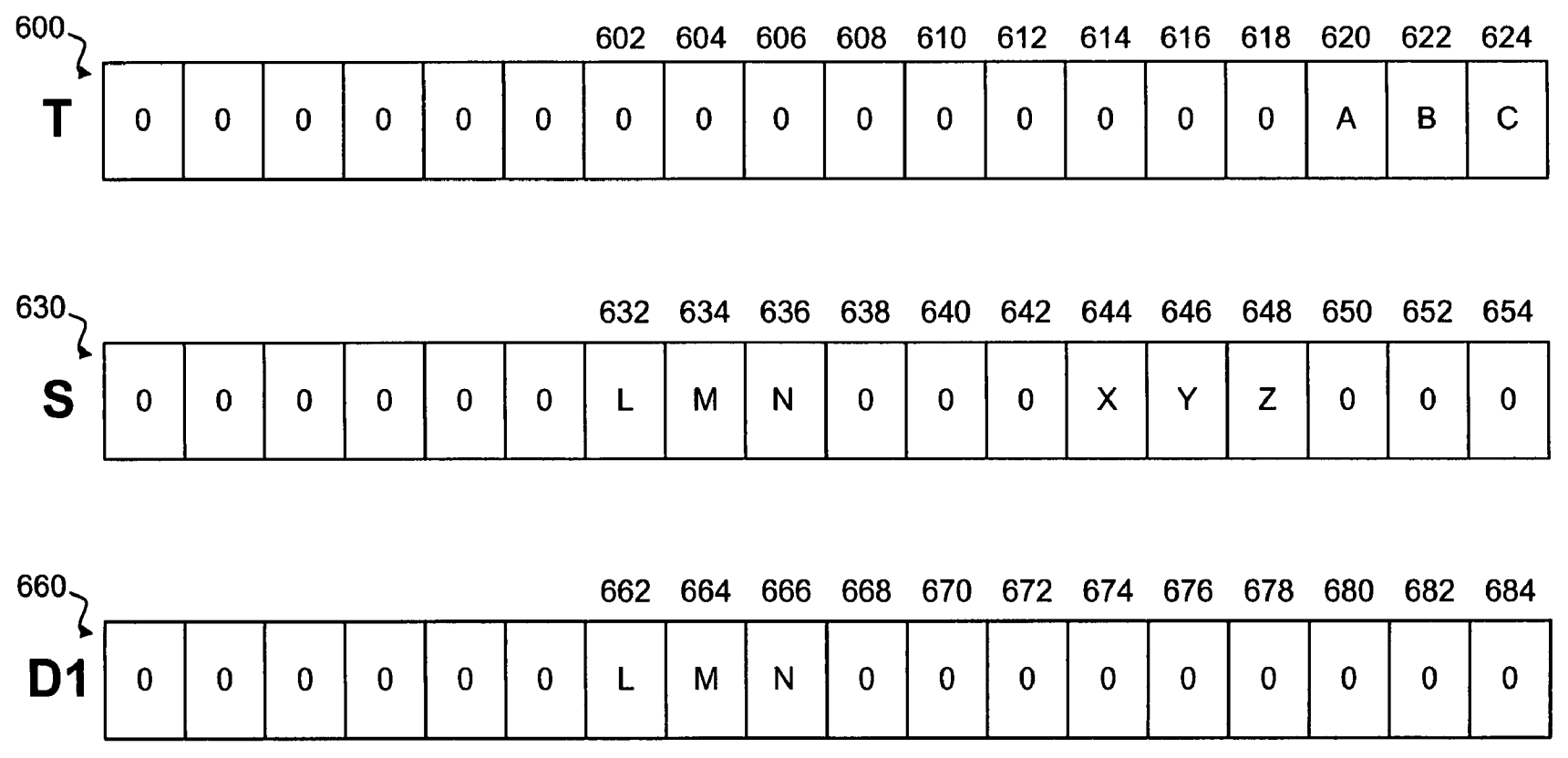

FIGS. 6a-c are diagrammatic views of the T-register 600, the S-register 630, and a D1-register 660, all being used for multiplication of exemplary data in a manner now in accord with the present inventive parallel multiplication mechanism 100. All three registers 600, 630, 660 here are part of the data stack 40, wherein the D1-register 660 is that just below the S-register in the 8-position circular data stack 40 of FIG. 2.

For the sake of this discussion, the T-register 600 has labeled bits 602-624, the S-register 630 has labeled bits 632-654, and the D1-register 660 has labeled bits 662-684. Each of the three registers 600, 630, 660 contains a right-justified value with unused bits zero-filled. Specifically, the T-register 600 holds the 3-bit value "ABC," the S-register 630 holds the 3-bit value "XYZ," and the D1-register 660 holds the 3-bit value "LMN."

FIG. 6*b* illustrates that the three bit value ("XYZ") in the S-register 630 has been shifted to the left three bit positions. However, XYZ is still a 3-bit value even though it is now represented by more bits. Here as well, this multiplicand has been shifted so that its least significant bit (LSB) is now one order higher than the most significant bit of the multiplier, and the vacated bits 650-654 have been zero-filled. FIG. 6*b* further illustrates that the three bit value ("LMN") in the D1-register 660 has been shifted to the left nine bit positions, three times the number of significant bits held in the T-register 600. Here as well, the vacated bits 668-644 have been zero-filled.

FIG. 6*c* illustrates a significant change to the S-register 630 in preparation for the use of the +* op-code. The value in the S-register 630 is now the equivalent of an exclusive or (XOR) operation between the S-register 630 and the D1-register 660 from FIG. 6*b*. The T-register 600 and the D1-register 660, however, are unchanged from FIG. 6*b*.

As can be seen next, performing parallel multiplication is now as simple as executing three sequential +* op-codes, the same as for two-factor multiplication. This multiplication is the equivalent of doing two distinct two-factor multiplications at the same time or, equivalently, multiplication with four total factors.

FIG. 6*d* illustrates the effect now of utilizing the +* op-code three successive times (again once for each significant bit of the multiplicand). The multiplier in the T-register 600 is now replaced with the product of the multiplier ABC with the multiplicand XYZ and with the multiplicand LMN, shown as "EFGHIJQRSTUV" here. This resultant product EFGHIJQRSTUV can have up to twelve significant bits. The parallel multiply here is also non-destructive or only partially destructive, because the S-register 630 and the D1-register 660 still hold the same values.

As an exercise, one can take binary "101" (decimal 5) as ABC, binary "100" (decimal 4) as XYZ, and "100" as LMN then apply the +* op-code for multiplication in the manner just described, and confirm that binary "010100" and "010100" (two instances of decimal 20, 5*4=20 and 5*4=20) is the result arrived at in EFGHIJQRSTUV.

It should be noted that the value located in the S-register 630 in FIG. 6*d* does not have to be viewed as a single 12-bit value. Instead, an alternative view can be taken which allows the parallel multiplication technique to accomplish more than one multiplication during the same number of sequential +* op-codes. The product EFGHIJQRSTUV then is actually two six bit products which have been merged together. The six LSBs of EFGHIJQRSTUV, QRSTUV, is the product of ABC and XYZ the same way this product is shown in FIGS. 5*a-c*. The six MSBs of EFGHIJQRSTUV, EFGHIJ, is the product of ABC and LMN produced via the parallel multiplication technique.

Summarizing, very powerful multiplication is possible now utilizing a single instruction from the Venture Forth™ instruction set, namely the +* op-code.

Given the constraints imposed by the register design of many modern processors, such as the SEAforth™ 24a device, there are only certain combinations of bit sizes for values placed within the T register and the S register such that the appropriate multiplication will take place. For example, the value in the S register could be representative of three values and then the resultant multiplication of the value contained by the T register and the S register results in a product containing the multiplication for a total of six factors. An example of this is shown in FIGS. 7 and 8*a-c*, wherein FIG. 7 shows Venture Forth™ code to carry out the parallel multiplication in accord with the inventive parallel multiplication mechanism 100, and FIGS. 8*a-c* show the contends of the T and S registers during an example calculation using the code in FIG. 7.

FIG. 7 is a code listing 700 for use in the SEAforth™ 24a device, with line numbers 702-730 added for reference. Beginning with line 702, this code has been placed into node 3 (computer 12*c* in FIG. 1) and line 704 indicates that the code will be placed into word 0 in RAM 34 (FIG. 2) of node 3. Line 706 is a colon definition describing the use of shifting (shift right) needed for a mask which assists in pulling the three products from the T register. Line 710 begins the colon definition describing a particular software embodiment of the parallel multiplication technique which begins on line 712 with the placement of three values on the data stack 40. Of the three values placed, $3F, $10A20, and $7, it is only the latter two that are currently of importance.

With reference now also to FIGS. 8*a-c*, it can be seen that the binary equivalent of $7 (or decimal 7) is placed in the T-register 800 and the binary equivalent of $10A20 is placed in the S-register 840. Recall that a register can contain instructions, data, and perhaps even some combination thereof. The value located in the S-register 840 in FIG. 8*a* can be viewed as $10A20 when viewed as its full 18-bit length, however, it is also possible to view the S register as three 3-bit values (decimal 2, 5, and 4) which have been padded with leading zeros. In FIG. 8*a* bits 842-852 are representative of a decimal two in bits 842-846, where bit 846 is considered the LSB and bits 848-852 are leading zeros; bits 854-864 are representative of a decimal five in bits 854-858, where bit 858 is considered the LSB and bits 860-864 are leading zeros; and bits 866-876 are representative of a decimal four in bits 866-870 where bit 870 is considered the LSB and bits 872-876 are leading zeros. The representation of three 3-bit values shown in the S-register 840 here in FIG. 8*a* is an extension conceptually of the two multi-bit values in the S-register 630 of FIG. 6*c*.

FIG. 8*b* corresponds with completion of line 714 in FIG. 7, in which three +* op-codes have been performed to complete multiplication of the values that were in the T-register 800 and S-register 840. The T-register 800 now contains the result, three products (replacing the 3-bit value used as a multiplier three ways), and the S-register 840 still contains the three 3-bit multiplicands. It should be noticed that the same number of +* op-codes were executed, three, as in the case when multiplication of two 3-bit factors took place.

The three products formed during the three +* operations are now located in the T-register 800 of FIG. 8*b*, in much the same way that the three factors were previously positioned in the S-register 840 of FIG. 8*a*. In the T-register 800 now, bits 802-812 represent the product of decimal seven with decimal two, decimal 14 (or binary equivalent '001110'); bits 814-824 represent the product of decimal seven with decimal five, decimal 35 (or binary equivalent '100011'); and bits 826-836 represent the product of decimal 7 with decimal 4, decimal 28 (or binary '011100'). Thus our six factor parallel multiplication is complete.

Digressing, it was stated above that the value $10A20 in the S-register 840 in FIG. 8*a* was being viewed as three 3-bit values (decimal 2, 5, and 4). This was done to illustrate that the present inventive parallel multiplication mechanism 100 can be extended from two to three multiplicands. Potentially, it can be extended to any number of multiplicands, as long as the bit-with of the memory locations used permit this.

Additionally, this example can be viewed still alternately. For example, the value $10A20 in the S-register 840 in FIG. 8a can instead be viewed as two values, a 9-bit value (decimal 133) and a 3-bit value (decimal 4), and then what is in the T-register 800 in FIG. 8b represents the product decimal 931 in bits 802-824 and the product decimal 28 in bits 826-836. Accordingly, it can be seen that the multiplicands can have different lengths and that how this is done and what the result represents is a matter of problem set-up that is not limited by the +* op-code.

In FIG. 7, the remainder of the Venture Forth™ code, in lines 716-728 is utilized to extract the three resultant products. FIG. 8c shows the T-register 800 and the S-register 840 after execution of the first over op-code found in line 722 of FIG. 7. Extracting the remaining two products is completed in a like manner to the first product extraction.

We can now summarize and state some generalizations. FIGS. 6a-d show the inventive parallel multiplication mechanism 100 used for a 4-factor multiply. FIG. 7 shows Venture Fourth™ code for a 6-factor multiply in accord with the inventive parallel multiplication mechanism 100. And FIGS. 8a-c show the inventive parallel multiplication mechanism 100 used for a 6-factor multiply.

FIGS. 6a-b show set-up for the 4-factor multiply, and FIGS. 6c-d show before and after the multiply. In FIGS. 6a-c the T-register 600 is loaded with and holds a multiplier that commonly serves as two of the factors. In FIG. 6a the S-register 630 and the D1-register 660 are loaded with multiplicands that will respectively serve as the other two factors. In FIGS. 6b-c the multiplicand in the D1-register 660 is shifted as needed and combined into the S-register 630. Use of the D1-register 660 is finished now. Note, any manner of bringing the S-register 630 to its condition in FIG. 6c could have been used. FIG. 6c shows the point at which things are set-up for formal multiplication, and FIG. 6d shows the point at which formal multiplication is finished for the 4-factor multiply in this example. Between FIG. 6c and FIG. 6d, the necessary number of +* op-codes have been performed.

In FIG. 7 most of the lines of code are for set-up and wrap-up (specifically, extraction of the three results. The inventive parallel multiplication mechanism 100, per se, is represented here in just line 712 and line 714. In an actual application, however, line 712 would be replaced with code to load the multiplier and the various multiplicands, to manipulate the multiplicands (e.g., shifted), and to combine and load them into a register.

FIGS. 8a-c show before, after, and some wrap-up for a 6-factor multiply. FIG. 8a shows the before stage, wherein the T-register 800 is loaded with and holds a multiplier that commonly serves as three of the factors and the S-register 840 is already loaded with multiplicands that will respectively serve as the other three factors. FIG. 8b shows the point at which formal multiplication is finished for the 6-factor multiply in this example. And FIG. 8c shows part of the wrap-up particular to how that is done with the code in FIG. 7 (N.b., something that is not part of the parallel multiplication mechanism 100, per se).

Herein we have shown a parallel multiplication mechanism 100. A 4-factor example of the use of this has been shown and extending this has been shown with a 6-factor example. Once these teachings are appreciated, extending this parallel multiplication mechanism 100 further should be straightforward for skilled artisans.

A major practical advantage of performing multiplication in the manner described is found in light of the kind of multiplication utilized for convolution in DSP. Recall that the convolution integral results in a large number of multiplications and additions. Also recall that this multiplication often consists of a small number of filter coefficients and a large number of data values used for producing output sums. The use of the inventive parallel multiplication mechanism 100, therefore, has clear application if convolution is viewed as a number of multiplications consisting of two factors in which one of those factors is held constant. The inventive parallel multiplication mechanism 100 is efficient when the factor that is held "constant" is a filter coefficient held in the T register and the dynamic factor is passing signal data put in the S register. One iteration of the inventive parallel multiplication mechanism 100 then efficiently produces more than one resultant product.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A mechanism for performing parallel multiplication on a plurality of factors, comprising:
   a binary processor;
   a first memory comprising a plurality of bit-positions in said processor, said first memory to hold a first value as a multiplier that will commonly serve as multiple of the factors;
   a second memory comprising a plurality of other said bit-positions in said processor, said second memory to hold a second value, wherein said second value is representative of multiple multiplicands that are other of the factors;
   a logic to determine a multiplier bit-count of significant bits in said multiplier; and,
   a logic to perform a +* operation with said first value and said second value a quantity of times equaling said multiplier bit-count.

2. The mechanism of claim 1, wherein at least one of said first memory and said second memory is a register.

3. The mechanism of claim 2, wherein said processor has a stack based architecture and said register is in a said stack.

4. The mechanism of claim 1, wherein said +* operation is an operational code in said processor.

5. The mechanism of claim 1, further comprising:
   a logic to determine multiplicand-bit counts of significant bits in each said multiplicand;
   a logic to load said second value into said second memory, wherein:
      each said multiplicand is allocated a portion of said second memory respectively comprising a quantity of said bit-positions equaling at least its said multiplicand bit-count plus said multiplier bit-count;
      each said multiplicand is placed in its said portion in its said bit-positions high-order shifted said multiplier bit-count times; and,
      said bit-positions in said portions not occupied by a said multiplicand are zero-filled.

6. The mechanism of claim 1, wherein the mechanism produces a plurality of products in a third memory, the mechanism further comprising:
   a logic to extract an individual said product from said third memory.

7. The mechanism of claim 6, wherein said logic to extract masks part of said third memory.

8. The mechanism of claim 6, wherein said third memory is said first memory or said second memory.

9. A method for performing parallel multiplication on a plurality of factors in a processor, the method comprising:

providing a first value in a first memory of the processor, wherein said first value is a multiplier that commonly serves as multiple of the factors and has significant bits that define a count;

providing a second value in a second memory of the processor, wherein said second value is representative of multiple multiplicands that respectively are other of the factors; and, said count number of times, performing a +* operation in the processor with said first value and said second value to arrive at a plurality of products.

10. The method of claim 9, wherein said +* operation is an operational code in the processor.

11. The method of claim 9, further comprising:

determining multiplicand-bit counts of significant bits in each said multiplicand;

loading said second value into said second memory, by:

allocating a portion of said second memory for each said multiplicand that respectively comprises a quantity of said bit-positions equaling at least its said multiplicand bit-count plus said multiplier bit-count;

placing each said multiplicand in its said portion in its said bit-positions high-order shifted said multiplier bit-count times; and, zero-filling said bit-positions in said portions not occupied by a said multiplicand.

12. The method of claim 9, wherein the plurality of products are in a third memory, the method further comprising extracting an individual said product from said third memory.

13. The method of claim 12, wherein said extracting includes masking part of said third memory.

14. The method of claim 13, wherein said third memory is said first memory or said second memory.

* * * * *